(12) United States Patent
Giffen et al.

(10) Patent No.: US 12,457,441 B2
(45) Date of Patent: *Oct. 28, 2025

(54) INFORMATION HANDLING SYSTEM WITH AN INTEGRATED WIRELESS CHARGER

(71) Applicant: DELL PRODUCTS L.P., Round Rock, TX (US)

(72) Inventors: Jonathan C. Giffen, Austin, TX (US); Gregory L. Henderson, Round Rock, TX (US); Mikaela M. Noe, Wimberley, TX (US); Stefanie Marie Thompson, Brownsville, TX (US)

(73) Assignee: Dell Products L.P., Round Rock, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/534,127

(22) Filed: Dec. 8, 2023

(65) Prior Publication Data

US 2024/0114279 A1 Apr. 4, 2024

Related U.S. Application Data

(63) Continuation of application No. 17/386,864, filed on Jul. 28, 2021, now Pat. No. 11,902,732.

(51) Int. Cl.
*H02J 7/00* (2006.01)
*H02J 50/00* (2016.01)
*H02J 50/10* (2016.01)
*H02J 50/40* (2016.01)
*H04R 1/10* (2006.01)

(52) U.S. Cl.
CPC .......... *H04R 1/1025* (2013.01); *H02J 50/005* (2020.01); *H02J 50/10* (2016.02); *H02J 50/402* (2020.01); *H04R 1/1008* (2013.01); *H02J 2310/22* (2020.01)

(58) Field of Classification Search
None
See application file for complete search history.

(56) References Cited

U.S. PATENT DOCUMENTS

| | | | |
|---|---|---|---|
| 8,496,570 B2 * | 7/2013 | Culhane | A61N 2/02 600/13 |
| 10,516,431 B2 | 12/2019 | DiLella | |
| 11,011,133 B2 | 5/2021 | Yong et al. | |
| 2008/0290736 A1 | 11/2008 | Onishi et al. | |
| 2009/0141918 A1 | 6/2009 | Chris et al. | |
| 2012/0200170 A1 | 8/2012 | Sabo | |
| 2012/0299594 A1 | 11/2012 | Habara et al. | |
| 2016/0351324 A1 | 12/2016 | Graham et al. | |
| 2018/0157300 A1 | 6/2018 | Kamepalli et al. | |
| 2019/0173326 A1 | 6/2019 | Gupta et al. | |

(Continued)

*Primary Examiner* — Arun C Williams
(74) *Attorney, Agent, or Firm* — Larson Newman, LLP

(57) ABSTRACT

A wireless charger inductively charges devices of various shapes and/or types, such as with multiple bend radii. Smartphones, headphones, key fobs, and other wireless devices may be laid atop the wireless charger. The wireless charger has flexible and pliable features that conform to the shape of the wireless device. The flexible and pliable features maintain a conformal relationship with the wireless device laid atop the wireless charger. The flexible and pliable features increase the efficiency of inductive power transfer and can reduce charge times and/or reduce heat generated due to thermal losses.

20 Claims, 9 Drawing Sheets

(56) References Cited

U.S. PATENT DOCUMENTS

2019/0198212 A1    6/2019  Levy
2022/0221538 A1*   7/2022  Deng .................... A61B 5/702
2022/0376549 A1    11/2022 Philip et al.

* cited by examiner

The same charging pad can charge flat devices and curved devices.

INFORMATION HANDLING SYSTEM WITH AN INTEGRATED WIRELESS CHARGER

CROSS-REFERENCE TO RELATED APPLICATION

This application is a Continuation of U.S. patent application Ser. No. 17/386,864 entitled "INFORMATION HANDLING SYSTEM WITH AN INTEGRATED WIRELESS CHARGER," filed Jul. 28, 2021, the disclosure of which is hereby expressly incorporated by reference in its entirety.

FIELD OF THE DISCLOSURE

The present disclosure generally relates to an information handling system, and more particularly relates to a flexible, wireless inductive charger deployed from an outer enclosure of the information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A wireless charger inductively charges devices of various shapes and/or types. Smartphones, headphones, key fobs, and other wireless devices may be laid atop the wireless charger. The wireless charger has flexible and pliable features that conform to the shape of the wireless device. The flexible and pliable features maintain a conformal relationship with the wireless device laid atop the wireless charger. The flexible and pliable features increase the efficiency of inductive power transfer and can reduce charge times and/or reduce heat generated due to thermal losses.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
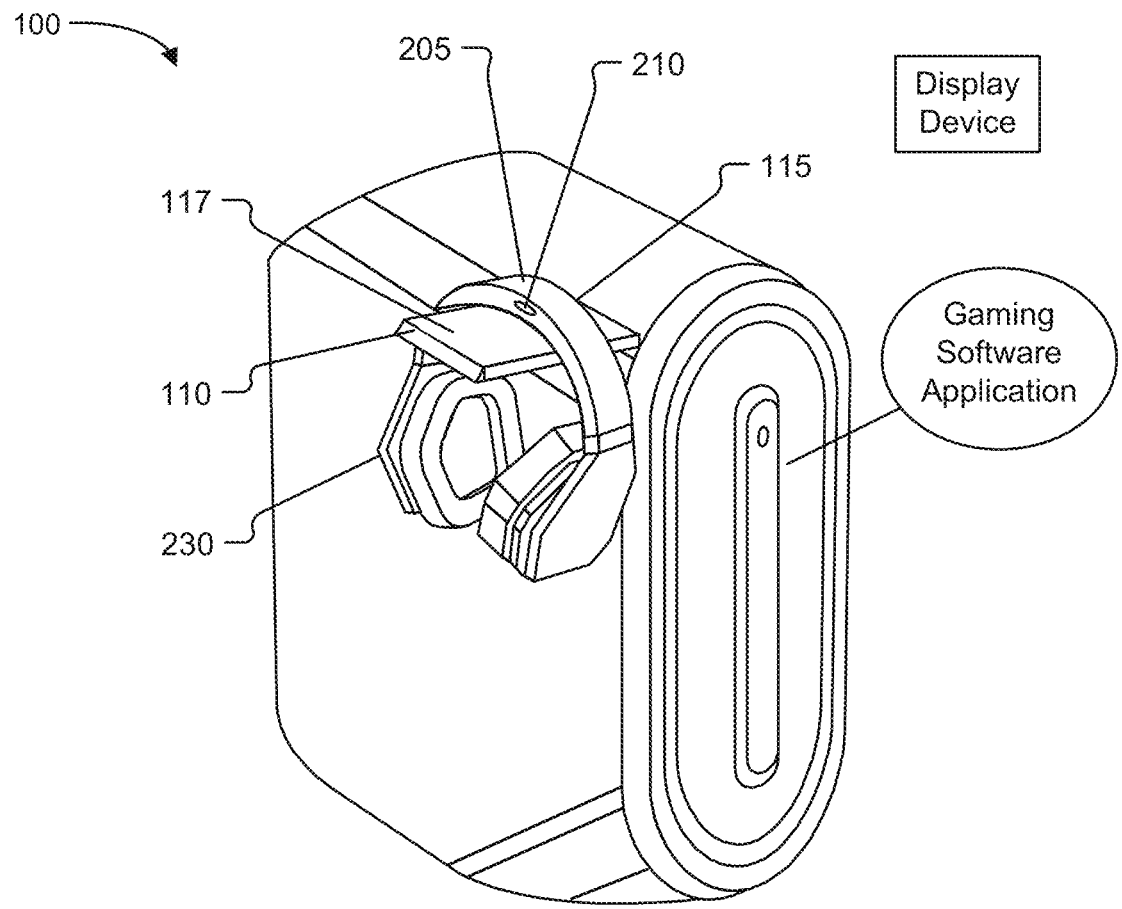
FIG. 1 is a block diagram illustrating an information handling system with an integrated wireless charging solution, according to an embodiment of the present disclosure.

FIG. 1 is a simplified illustration of an information handling system in the form of a desktop computer 100 interfacing with a display device and wireless devices such as wireless headphones 115. The desktop computer 100 may be used for any software-related tasks, and in particular, may be used for computer gaming. The desktop computer has a hardware processor, memory device, and other internal electronic components (not shown for simplicity). As the desktop computer 100 executes a gaming software application, the desktop computer generates action video and audio content. The desktop computer 100 commands or instructs the display device to display the video content. The desktop computer 100 also commands or instructs the wireless headphones 115 to output the audio content. As a user plays the video game, the user wears the wireless headphones 115 for a submersive experience.

The wireless headphones 115 generally have one or more internal batteries, such as battery 230 that provide electrical power to internal electronics (not shown for simplicity). As the user plays the video game, the internal electronics consume and deplete the electrical power stored by the battery 230. When the wireless headphones 115 need recharging, the user may deploy a wireless charging pad or wireless charger 110. The wireless charger 110 outwardly extends from an outer enclosure of the desktop computer 100. The wireless charger 110 may even stow and retract from within the chassis, if desired.

The wireless headphones 115 preferably are inductively charged. When the battery 230 in the wireless headphones 115 need replenishing, the user merely places the wireless headphones 115 on top of the wireless charger 110. The user, for example, may hang a headband 205 of the wireless headphones 115 over the wireless charger 110. As the wireless headphones 115 hang from the wireless charger 110, the wireless charger 110 delivers electrical power to the battery 230 installed or located within the wireless headphones 115. In particular, the wireless charger 110 has a transmission coil 117, and the wireless headphones 115 have a receiver coil 210. When electrical power, such as current and voltage, flows through the transmission coil 117, the transmission coil 117 and the receiver coil 210 electromagnetically couple according to electromagnetic properties. The transmission coil 117 inductively transfers electrical power from the transmission coil 117 to the receiver coil 210. The electronics internal to the wireless headphones 115 may then process and deliver the electrical power to charge the battery 230. Electromagnetic induction is very well known, so its details need not be further explained.

The wireless charger 110 conforms to the shape of the headband 205. The receiver coil 210 is located in the headband 205 of the wireless headphones 115. Testing has shown that for inductive charging to be most efficient, the receiver coil 210 and the transmission coil 117 should be as equidistant as possible. That is when the receiver coil 210 sits atop the transmission coil 117, the shapes or profiles of the receiver coil 210 and the transmission coil 117 should match as much as possible. Because the receiver coil 210 is located within the headband 205, the receiver coil 210 has a semi-circular, elliptical, or arcing curvature. The transmission coil 117 located within the wireless charger 110 should have a generally matching curvature. The wireless charger 110 thus has features and portions that are flexible to conform to the curvature shape of the headband 205.

The wireless charger 110, in other words, deforms due to the weight of the wireless headphones 115 and conforms to the shape of headband 205. As the wireless headphones 115 hang from the wireless charger 110, the weight of the wireless headphones 115 causes the transmission coil 117 to flexibly bend and mold to the curvature of the receiver coil 210 located within the headband 205. Because the transmission coil 117 conforms to the curvature of the receiver coil 210, their geometries generally match for efficient inductive charging.

The bendable wireless charger 110 has many advantages. A typical charger for an electronic device includes a cable that usually creates clutter on and around the user's workspace. In addition, the cable is visually distracting, disorderly, and consumes desk space. To mitigate these issues, a user generally purchases a third-party accessory to hold a wireless headset or a wireless headphone, incurring additional cost. Wireless chargers allow a user to charge devices without the aforementioned issues associated with handling cables. However, because electronic devices have different geometric shapes, a different wireless device for each geometrical shape may be used, also resulting in the above issues. For example, phones are typically flat while headsets or headphones have typically curved headbands. Typically, a different wireless charger is used for a phone versus a headset or a headphone. This is because if a charging coil of a wireless charger is not equidistant or has a consistent uniform distance from a receiver coil of the device being charged, then the charging is inefficient.

The flexible wireless charger 110, however, accommodates the shape of any wireless headphone, regardless of manufacturer and regardless of the user's head shape. The wireless charger 110 thus provides a wireless charging solution configured to charge devices of different geometries or different bend radius, wherein the wireless charging solution is mechanically integrated into an information handling system. Such wireless charging solution optimizes charging efficiency for multiple device geometries while solving issues associated with clutter and similar issues mentioned above. Although the example embodiment depicts a desktop with the integrated wireless charger on the side of the chassis, other form factors may be used as well as other locations may be used to integrate the wireless charger. In addition, while a wireless headphone 115 is used as an example of a device being charged, other electronic devices may be charged by the wireless charger 110, such as a phone, a watch, a headset, an earbud, etc. The user may retract wireless charger 110 manually or via other means such as pressing a switch or key combination before use. Wireless charger 110 may include an indicator to alert or show the user when wireless headphones 115 is charging as well as fully charged. After charging wireless headphones 115, the user may simply remove the device. Wireless charger 110 may be flushed with the chassis automatically when wireless headphones 115 is removed. Wireless charger 110 may also be flushed manually by a push or pull mechanism or automatically by pressing a switch or key combination.

Figure 2:
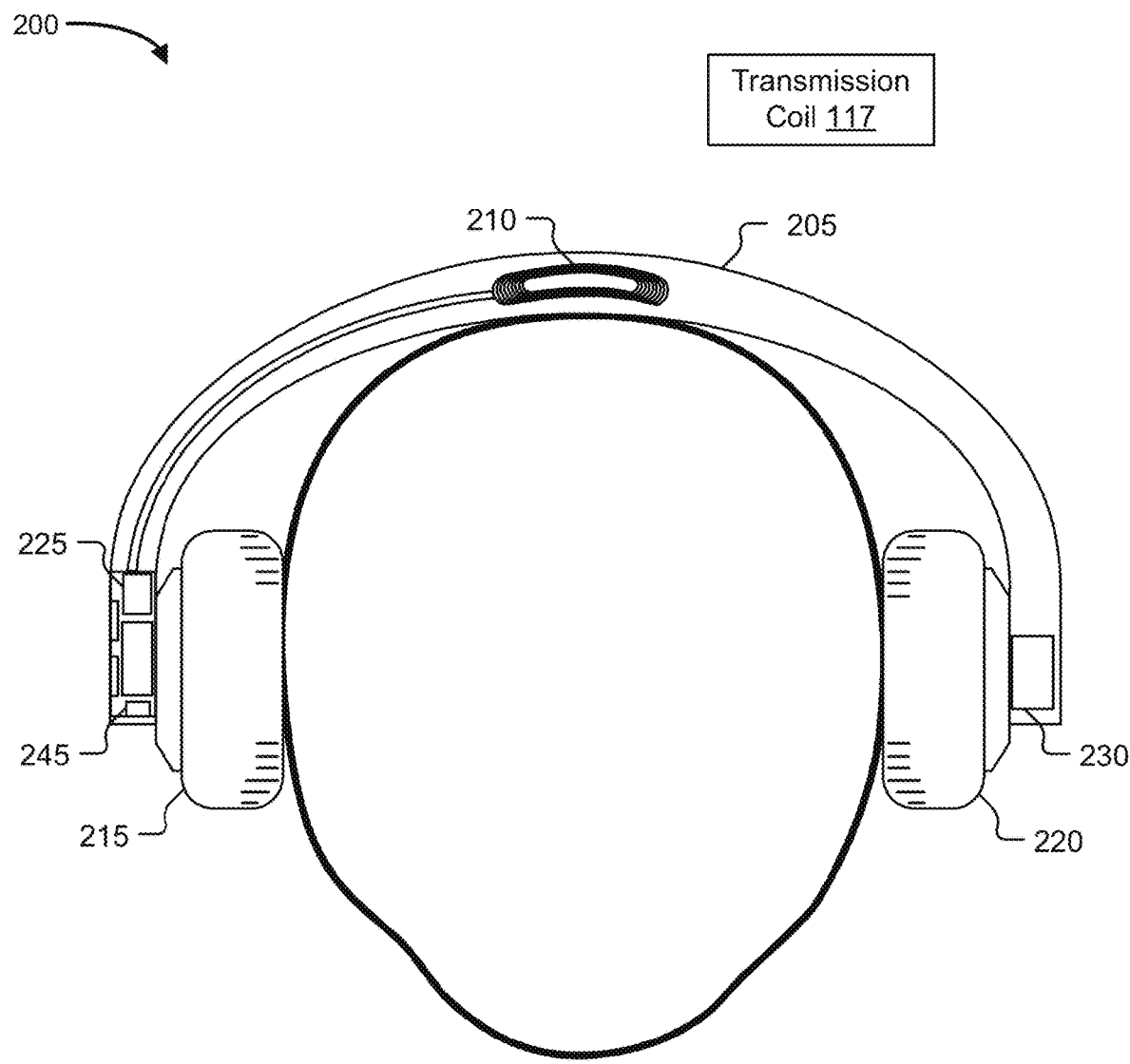
FIG. 2 is a block diagram illustrating an example of a wireless audio device according to an embodiment of the present disclosure.

FIG. 2 further illustrates the inductive wireless charging solution disclosed herein. The wireless headphones 115 include the headband 205 between a left ear portion 215 and a right ear portion 220. Headband 205 includes the receiver coil 210 for charging. Left ear portion 215 and right ear portion 220 each include a speaker. In addition, left ear portion 215 includes a charger/controller 225, and a communication interface 245. The right ear portion 220 contains a battery 230. Communication interface 245 may be a short-range, wireless communication interface such as Bluetooth™. Charger/controller 225 takes power from receiver coil 210 that is used to charge battery 230.

The wireless headphones 115 includes a pair of loudspeaker drivers worn on or around the head over the user's ear. The wireless headphones 115 may be a circumaural and supra-aural wireless audio device that uses headband 205 over the top of the user's head to hold the speakers in place. Exemplary embodiments, however, may be applied or adapted to any audio device, such as a headset, an earphone, an earbud, an earpiece, or a bone conduction audio device.

Receiver coil 210 may be configured to electromagnetically couple with the transmission coil 117 (sometimes described as a charging coil or an inductive charging coil) to enable inductive transmission of power. Here, receiver coil 210 is curved that matches the arc of headband 205. Various components may be disposed of within the headband 205, the left ear portion 215, and the right ear portion 220 in addition or instead of charger/controller 225, battery 230, a communication interface 245 such as a microphone, transceiver, a processor, a light-emitting diode, etc.

Figure 3B:
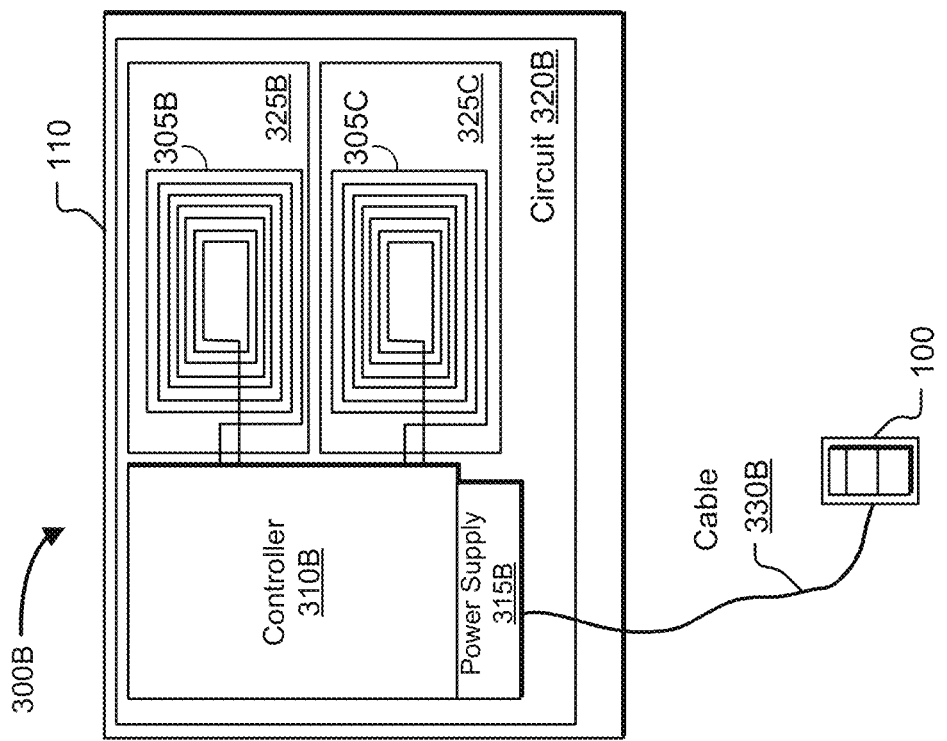
FIG. 3A and FIG. 3B are block diagrams illustrating an example of a wireless charger according to an embodiment of the present disclosure.
Figure 3A:
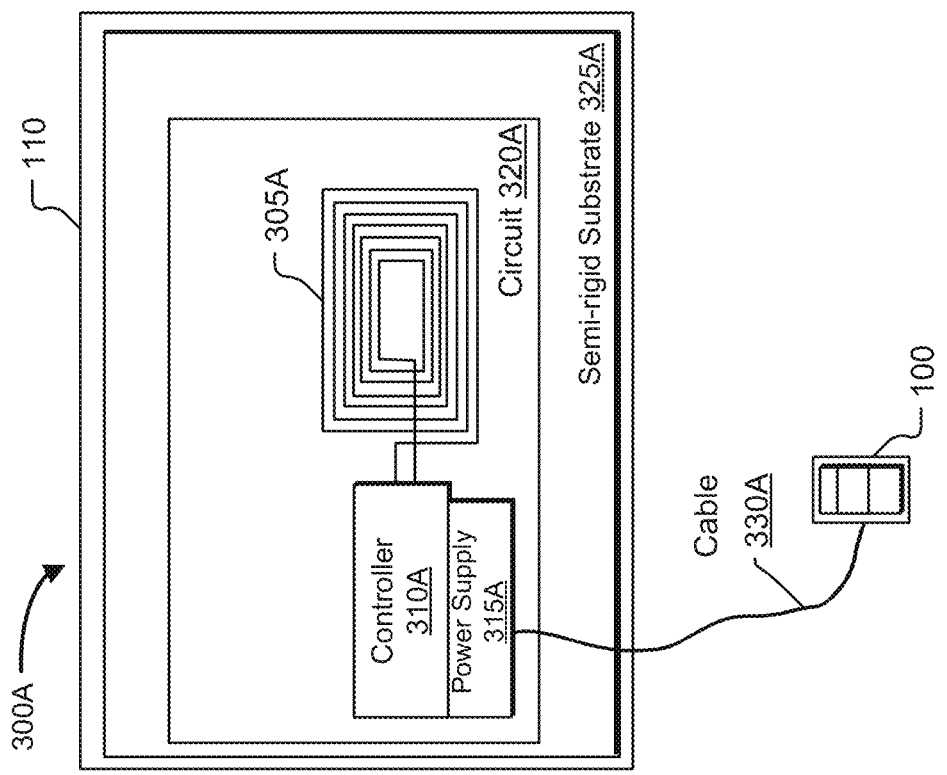

FIG. 3A shows the wireless charger 110 (illustrated as reference numeral 300A) integrated with the information handling system 100. Wireless charger 300A includes a circuit 320, which is a bendable electrical/electronic circuit, that includes a charging coil 305A, a controller 310A, a power supply 315A, and a cable 330A. Cable 330A may be a power/data cable that includes a communication interface to facilitate various functions such as to allow firmware updates to wireless charger 110 or provide the current state or status of wireless charger 110 or the device being charged. Charging coil 305A may be layered on top of a flexible sheet of electrically conductive ferrite material to provide additional structure and assist in the transmission of electromagnetic energy. Charging coil 305A and/or circuit 320A are mounted into a semi-rigid substrate 325A. Semi-rigid substrate 325A may be of a reduced conductive or even insulative polycarbonate sheet material, wherein the semi-rigid substrate may behave similarly to a playing card, such that it flexes in the middle when you squeeze it on both ends, but then it returns to its initial state or initial shape which is a flat shape when let go. The semi-rigid substrate 325A is thus pliable and supple to repeatedly bend (under the weight of the headband 205 of the wireless headphones 115) without breaking/cracking.

Wireless charger 300A may include a top portion that is a conformable non-slip cover that forms over circuit 320A. The conformable non-slip cover may be of conformation non-slip material such as an elastomer type polymer like a thin moldable rubber material that conforms to the shape of the device placed on wireless charger 300A. For example, the conformable non-slip cover may be of a class of copolymers or a physical mix of polymers such as a thermoplastic elastomer. The conformable non-slip cover may also be of a class of polyurethane plastics such as thermoplastic polyurethane. The conformable non-slip cover is cut, stamped, or molded and transmits or passes electromagnetic waves/signals from the transmission coil 117 to the receiver coil 210. Wireless charger 300A may also include a bottom portion that is a rigid base to support the conformable non-slip cover and circuit 320A. The rigid base may be made from various types of materials such as an injection-molded plastic like a thermoplastic polymer or a thermoplastic alloy. For example, the rigid base may be made of acrylonitrile butadiene styrene or polycarbonate/acrylonitrile-butadiene-styrene terpolymer blend.

Wireless charger 300A may use one of the various types of wireless power transfer mechanisms such as resonant inductive coupling, magnetic phase synchronous coupling, etc. to charge a device. In addition, wireless charger 300A may be configured to use one of several standards for wireless power transfer, such as the Power Matters Alliance's interface standard or the Wireless Power Consortium's Qi™ open interface standard.

Wireless charger 300A is a multi-device charging solution, also referred to as a wireless charging pad assembly, whose mechanical structure is configured to support and/or conform to both flat and curved devices to optimize efficiency for multiple devices geometries. Wireless charger 300A may be configured to flip out of the bezel or side plate of the information handling system or its chassis. The wireless charger 300A, for example, may include a hinge having a pair of leaves. One of the leaves is attached to an outer enclosure of the desktop computer 100. Another leaf is attached to the rigid base of the wireless charger 300A. The user may thus grasp the wireless charger 300A and pull or otherwise deploy from a stowage position. In addition, the architecture of wireless charger 300A supports different curved device designs and weight profiles.

For example, wireless charger 300A can support various wireless headset or wireless headphone designs, such as different widths and/or depths of the headband. Wireless charger 300A may be a combination wireless charger with an integrated headset hanger option that includes an induction coil. The induction coil is configured to conform to flat and curved shapes to allow charging of flat devices and curved devices such as wireless headsets or headphones with curved headbands. Wireless charger 300A may also support charging wireless headsets or headphones wherein the receiver coil is located in the ear portion of the headset or headphone.

Charging coil 305 may also be referred to as a transmitter as charging coils wirelessly transmits power to a receiver. Charging coil 305A may be activated when wireless charger 300A is flipped or slid out of the information handling system. The charging coil 305A receives electrical power, the charging coil 305 is active and may wirelessly transmit power. When charging coil 305A is inactive and not receiving electrical power, the charging coil may not transmit power.

Power supply 315A receives power from the motherboard of the information handling system via cable 330. Power supply 315 may be configured to provide electrical energy to charging coil 305. In one embodiment, power supply 315 may be configured to convert alternating current (AC) to low-voltage direct current (DC) power for the internal components of wireless charger 300. The power may be provided to wireless charger 300 when a switch is triggered by extending or retracting the wireless charger outside the chassis of the information handling system. The power to wireless charger 300 may be disabled when a switch is triggered when wireless charger 300 is not retracted or extended outside of the chassis but rather is inside the chassis of the information handling system. Wireless charger 300 may be retracted, extended, or moved inside the chassis by various mechanisms such as by pulling and/or pushing wireless charger 300. Wireless charger 300 may have a communication interface over the power/data cable with the desktop computer 100. This interface could be Universal Serial Bus (USB), or I2C, and could be used to advertise the state of charge, charge level, or negotiate charge limits and charging contracts with different peripheral devices. The cable 330 may also be used to facilitate firmware updates to the wireless charger 300.

FIG. 3B shows a wireless charger 300B similar to wireless charger 300A integrated with the information handling system 100. In this example, wireless charger 300 includes a circuit 320B which includes charging coils 305B and 305C, a controller 310B, a power supply 315B, and a power/data cable 330B. Controller 310B is similar to controller 310A, power supply 315B is similar to power supply 315A, and circuit 320B is similar to 320A. Charging coils 305B and 305C are similar to charging coil 305A of FIG. 3A. Charging coil 305B may be mounted in a semi-rigid substrate 325B. Charging coil 305C may be mounted in a semi-rigid substrate 325C. Semi-rigid substrates 325B and 325C are similar to semi-rigid substrate 325A. These charging coil sub-assemblies may be part of circuit 320B. Wireless charger 300B may be configured to charge two devices simultaneously, one device may be charged by charging coil 305B and the second device charged by 305C. Although wireless charger 305B is shown to have two charging coils, wireless charger 300B may have more than two charging coils which can then charge more than two devices simultaneously.

Figure 4:
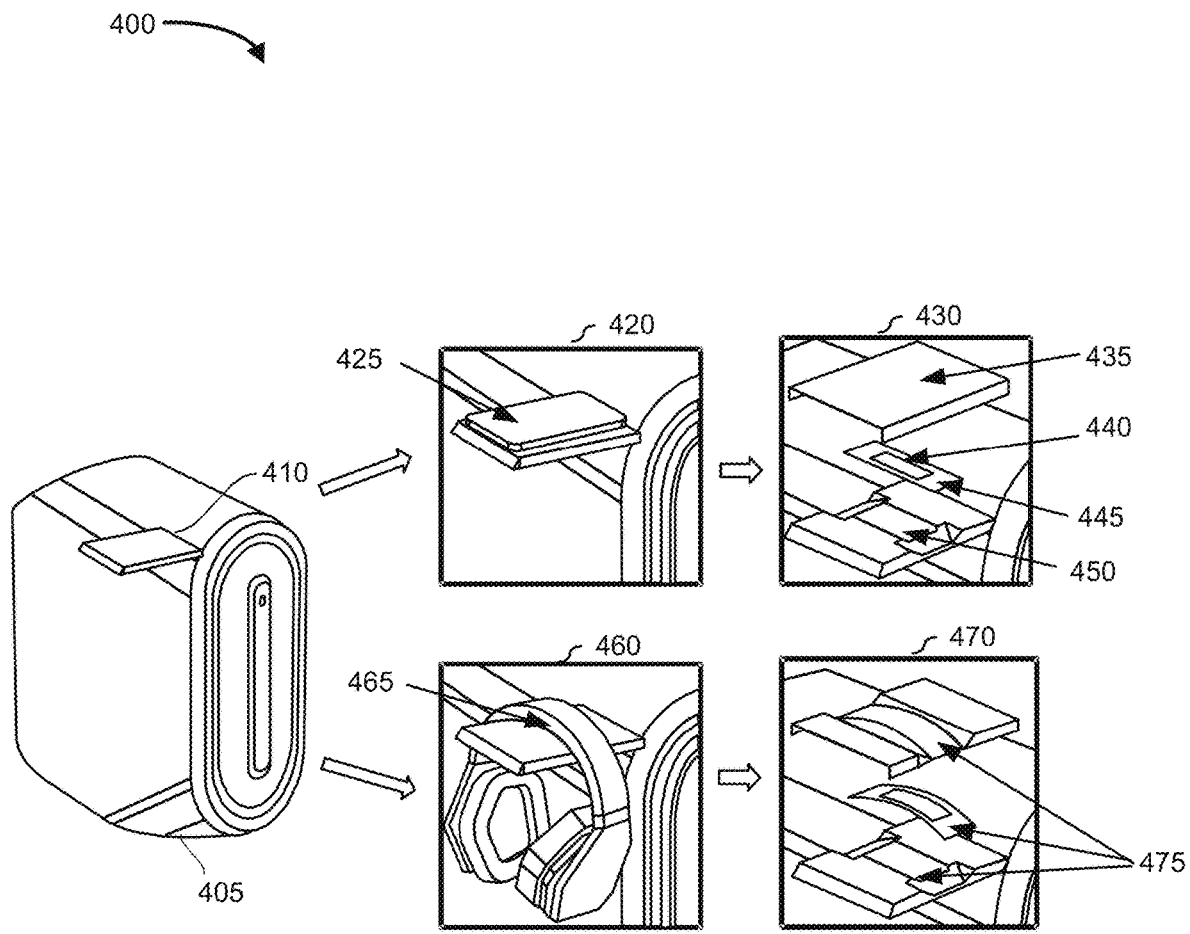
FIG. 4 is a block diagram illustrating an example of a wireless charger integrated into an information handling system, according to an embodiment of the present disclosure.

FIG. 4 shows a wireless charging system 400 for charging wireless devices of different geometries. Wireless charging system 400 includes an information handling system 405, similar to information handling system 100, having a retractable wireless charger 410 integrated with the chassis. FIG.

4 also shows a view 420 and an associated view 430. In addition, FIG. 4 also shows a view 460 and an associated view 470. Retractable wireless charger 410, also referred herein as a wireless charging pad or simply as a wireless charger, may be integrated into information handling system 405. The components shown are not drawn to scale and wireless charger 410 may include additional or fewer components.

Wireless charger 410 is configured provide wireless charging of electronic devices such as a phone, a headset, a headphone, an earbud, etc. when the electronic device is rested on the charging pad. Wireless charger 410 may have a pull or push mechanism wherein wireless charger 410 can be extended outside of the chassis as shown and can be pushed back inside the chassis typically when wireless charger 410 is not being used.

View 420 shows a perspective view of wireless charger 410 charging a flat device 425. View 430 shows an exploded view of wireless charger 410. Wireless charger 410, also referred to as a wireless charging pad assembly, includes a cover 435, a circuit 440, a substrate 445, and a base 450. Cover 435 is the top portion of wireless charger 410 and may be a conformable non-slip cover is disposed over a circuit 440 that is mounted to substrate 445 and base 450 which is the bottom portion. Cover 435 may be used to secure circuit 440 and be made from a material that can be adapted to the shape of a device laid on top of it. Here, flat device 425 is placed on wireless charger 410 which retained its flat geometry or shape that allows for the efficient charging of flat device 425.

Circuit 440, which is a middle portion of wireless charger 410 disposed between the top portion and the bottom portion, is a flexible circuit with an integrated charging coil that is mounted to a substrate 445. The substrate is made of semi-rigid material and is rigid enough to keep the charging coil straight for flat devices but flexible enough to allow the charging coil to bend, as depicted in view 470, for curved devices such as curved device 465 depicted in view 460.

View 460 is a perspective view of curved device 465 hanged on wireless charger 410. View 470 shows a bend 475 of an exploded wireless charger 410 based on view 430, wherein wireless charger 410 curves under the weight of curved device 465 to match the arc of curved device 465, wherein the weight applies a compression force on wireless charger 410 from an initial state of flat shape. In particular, cover 435, flexible circuit, and substrate 445 bends according to the weight of the device. Base 450 is rigid to support the weight of flat and curved devices when charging. In addition, base 450 with its unique geometry, along with conformable and semi-rigid material of cover 435 and substrate 445 respectively, allows cover 435, circuit 440, and substrate 445 to bend at pivot points and match the arc of curved device 465 or its curved portion that is proximate to cover 435 or wireless charger 410. The charging coil matching a particular geometry of a receiver coil allows for efficient charging of the device.

When curved device 465 is lifted off wireless charger 410, the semi-rigid material of substrate 445 may resume its initial shape when the weight of curved device 465 is removed allowing circuit 440 and the charging coil to resume their initial shape. In another embodiment, a spring on each end or in the middle of the semi-rigid substrate 445 may apply a force that would allow or assist the circuit and/or the charging coil to resume its initial shape after a curved device is removed or lifted from wireless charger 410.

Although wireless charger 410 is shown to include one charging coil capable of charging one device at a time, wireless charger 410 may include multiple charging coils capable of charging more than one device at the same time. For example, wireless charger 410 can charge a flat device such as a smartphone and a curved device such as a wireless headset simultaneously. In addition, wireless charger 410 can charge a third device such as an earbud.

Figure 5A:
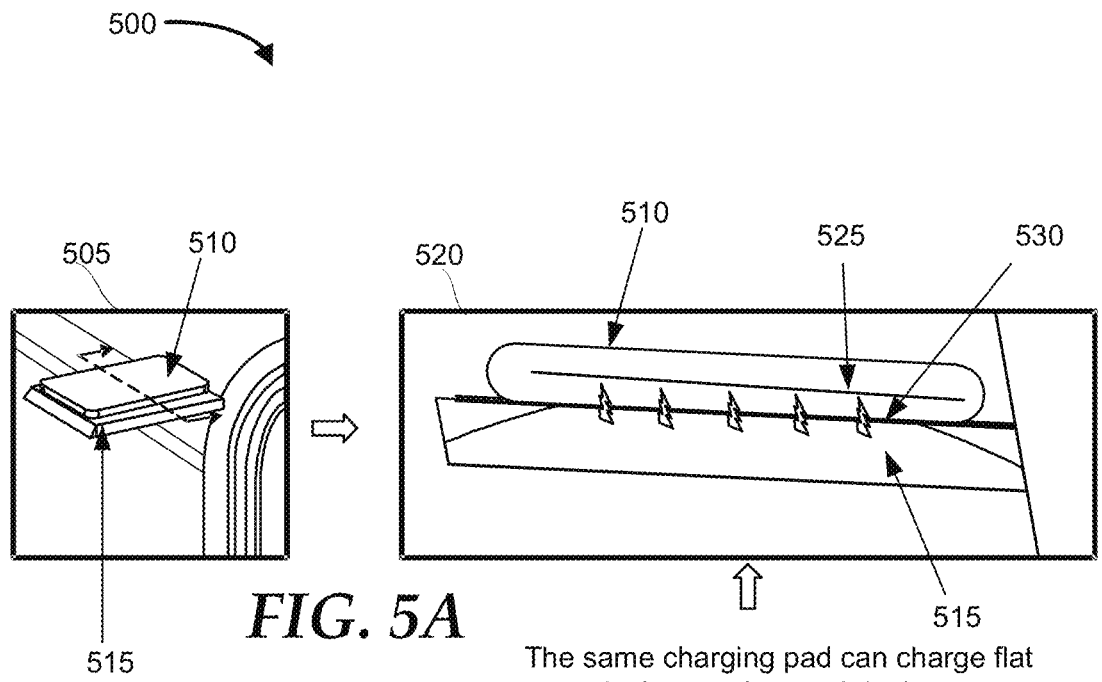
FIG. 5A and FIG. 5B are block diagrams illustrating an example of perspective and cross-section views of wireless charger integrated into an information handling system, according to an embodiment of the present disclosure.

FIG. 5A shows a perspective view 505 and a cross-section view 520 of a wireless charger that is integrated with an information handling system. Perspective view 505 shows a flat device 510 on a wireless charger 515. Flat device 510 may be an electronic device such as a smartphone, a notepad, a notebook, etc. that is capable of wireless charging. Cross-section view 520 shows receiver coil 525 of flat device 510. Cross-section view 520 also shows charging coil 530 of wireless charger 515. Here, because of the equidistance or uniform distance between receiver coil 525 and charging coil 530, such as when both receiver coil 525 and charging coil 530 are flat, then wireless charging of flat device 510 is deemed efficient.

Figure 5B:
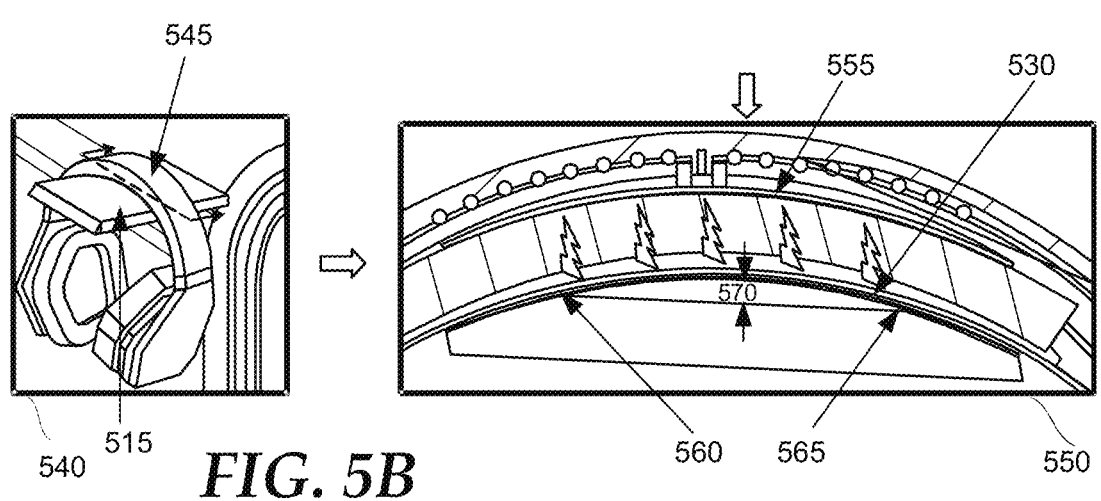

FIG. 5B shows a perspective view 540 and a cross-section view 550 of wireless charger 515 that is integrated with an information handling system. Perspective view 540 shows a curved device 545 on a wireless charger 515. Curved device 545 may be an electronic device such as a wireless headset, wireless phone, Wireless wearable, or similar device that is capable of wireless charging. Further, curved device 545 includes a receiver coil 555 in the headband of curved device 545. As such, the arc of receiver coil 555 is similar to the arc of the headband.

Cross-section view 550 shows receiver coil 555 of curved device 545 aligned over charging coil 530. Cross-section view 550 also shows charging coil 530 of wireless charger 515 bent at a pivot point 560 and a pivot point 565 that allows the arc of charging coil 530 to match the arc of receiver coil 555 with a minimum air gap 570 between the coils. Because the design of wireless charger 515 allows a uniform distance between the charging and receiver coils, maximum power transfer for both flat and curved devices is achieved using the same charger. In this example, receiver coil 555 and charging coil 530 are equidistant, which allows the wireless charging of curved device 545 to be efficient.

Figure 6:
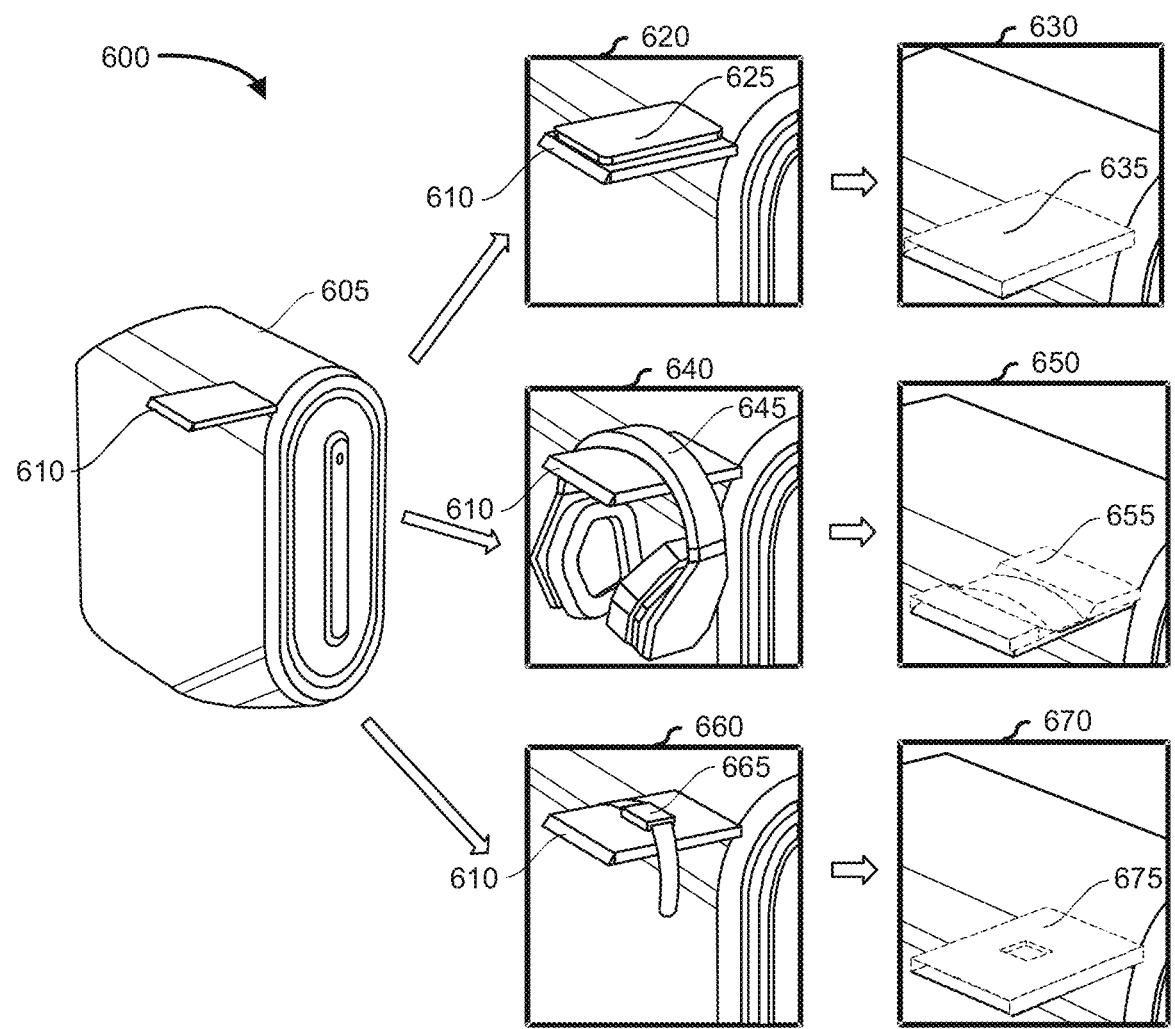
FIG. 6 is a block diagram illustrating a wireless charger integrated into an information handling system, according to an embodiment of the present disclosure.

FIG. 6 shows a wireless charging system 600 for charging wireless devices of different geometries. Wireless charging system 500 is similar to wireless charging system 400 of FIG. 4. Wireless charging system 600 includes an information handling system 605 having a retractable wireless charger 610 integrated with the chassis. FIG. 6 also shows a view 620 and an associated view 630. In addition, FIG. 6 also shows a view 640 and an associated view 650. Finally, FIG. 6 shows a view 660 and an associated view 670. The views show a shape or geometry taken by a portion of wireless charger 610 which may include a cover, charging coil, and semi-rigid substrate. The weight applies a compression force that alters the shape of the portion of wireless charger 610. The shape may be based on the shape or geometry and the weight of the device placed on wireless charger 610. Retractable wireless charger 610, also referred herein as a wireless charging pad or simply as a wireless charger, may be integrated into information handling system 605. The components shown are not drawn to scale and wireless charger 610 may include additional or fewer components.

View 620 shows a perspective view of wireless charger 610 charging a flat device 625. View 630 shows a perspective view of a geometry 635 of a portion of wireless charger 610 underneath the weight of flat device 625. Here, because flat device 625 is of a flat geometry, the portion of wireless charger 610 assumes the shape of geometry 635 which is flat.

View 640 shows a perspective view of wireless charger 610 charging a wireless headset 645. View 650 shows a perspective view of a geometry 655 of the portion of wireless charger 610 underneath the weight of wireless headset 645. Here, because a curved portion of wireless headset 645 is placed on wireless charger 610, a portion of wireless charger 610 bends to match the curve of wireless headset 645 that is proximate to the cover.

View 660 shows a perspective view of wireless charger 610 charging a smartwatch 665. View 670 shows a perspective view of a geometry 675 of a portion of wireless charger 610 underneath the weight of smartwatch 665. Here, because a flat portion of smartwatch 665 is proximate to a portion on wireless charger 610, a portion of wireless charger 610 shows an indentation to match the shape of the flat portion of smartwatch 665 that is proximate to the cover. Here, the weight of smartwatch 665 may be enough to cause the cover to have an indentation, while the charging coil and the semi-rigid substrate remains flat.

Figure 7:
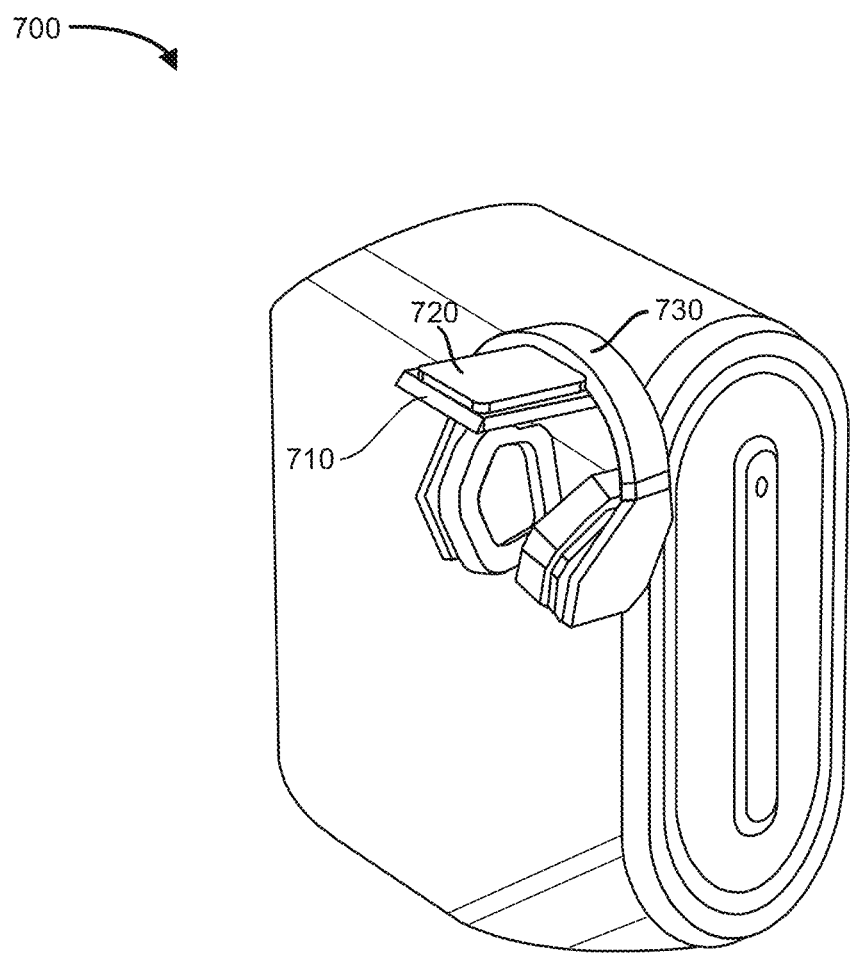
FIG. 7 is a block diagram illustrating a wireless charger integrated into an information handling system, according to an embodiment of the present disclosure.

FIG. 7 shows an information handling system 700 with an integrated wireless charging pad assembly 710 similar to the integrated wireless charging pad assembly 110 of FIG. 1. In this example wireless charging pad assembly 710, also referred to as wireless charger 710, is retractable from the chassis of information handling system 700. In addition, wireless charger 710 is configured to charge two devices at the same time, such as a smartphone 720 and a wireless headset 730. To accommodate charging two devices simultaneously, wireless charger 710 may have at least two charging coil sub-assemblies similar to FIG. 3B, one for each device, wherein each charging coil sub-assembly and proximate cover would be of a geometry based on the device being charged. For example, a charging coil sub-assembly and proximate cover that is charging wireless headset 730 would bend to match the curve of the headband while a second charging coil sub-assembly and proximate cover that is charging smartphone 720 would have a flat geometry.

Figure 8:
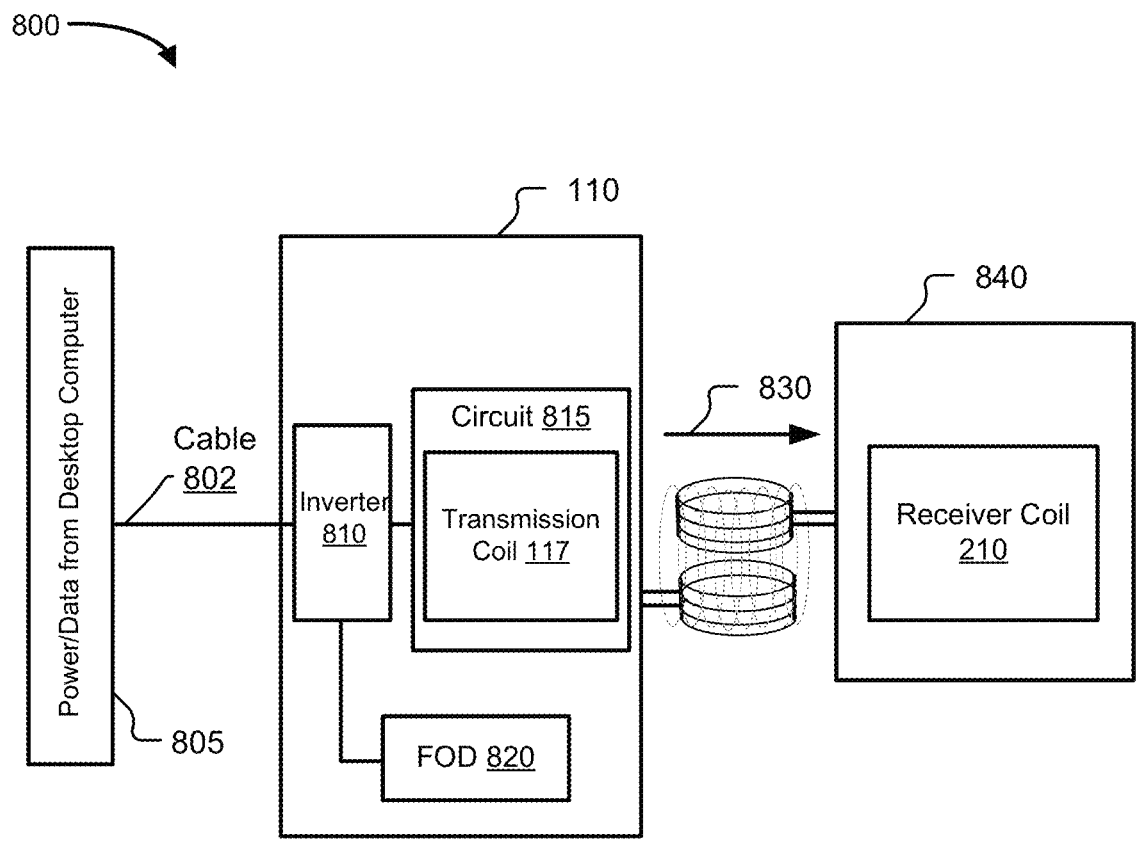
FIG. 8 is a block diagram illustrating a wireless charging mechanism, according to an embodiment of the present disclosure.

FIG. 8 shows a system 800 for wireless charging mechanism using inductive power transmission to a wireless device similar to the inductive wireless charging solution disclosed in FIG. 2. System 800 includes power/data 805 from desktop computer 100 transmitted to wireless charger 110 via a cable 802 similar to cable 330A of FIG. 3A. Wireless charger 110 includes an inverter 810, a foreign object detector (FOD) 820, and a circuit 815 that includes transmission coil 117. Wireless charger 110 is depicted to be wirelessly charging wireless device 840 with receiver coil 210. The components shown are not drawn to scale and wireless charger 410 may include additional or fewer components.

Power/data 805 from desktop computer 100 may be regulated using an inverter 810 which may be a full-bridge inverter. Wireless power transfer relies on magnetic induction between transmitter and receiver coils such as transmission coil 117 and receiver coil 210 respectively. Here, power is transferred from transmission coil 117 to receiver coil 210. It is desirable that transmission coil 17 and receiver coil 210 are aligned for effective coupling and efficient power transfer. A foreign object, such as a coin, paper wrapper, pharmaceutical wrapper, foil, etc. may obstruct the alignment, or the coupling of the transmission coil 117 and receiver coil 210 may interfere with the power transfer. In addition, the foreign object may be a safety hazard since some metal objects can heat up to over one hundred degrees centigrade when placed between a transmitter and a mobile or wireless device, which may damage the device or damage the skin of a user holding the device. FOD 820 allows inverter 810 to disable a charge contract if a foreign object is detected. As such, FOD 820 may be included in wireless charger 110 to detect foreign objects present around the electrical field area depicted at 830 during an active charge.

Figure 9:
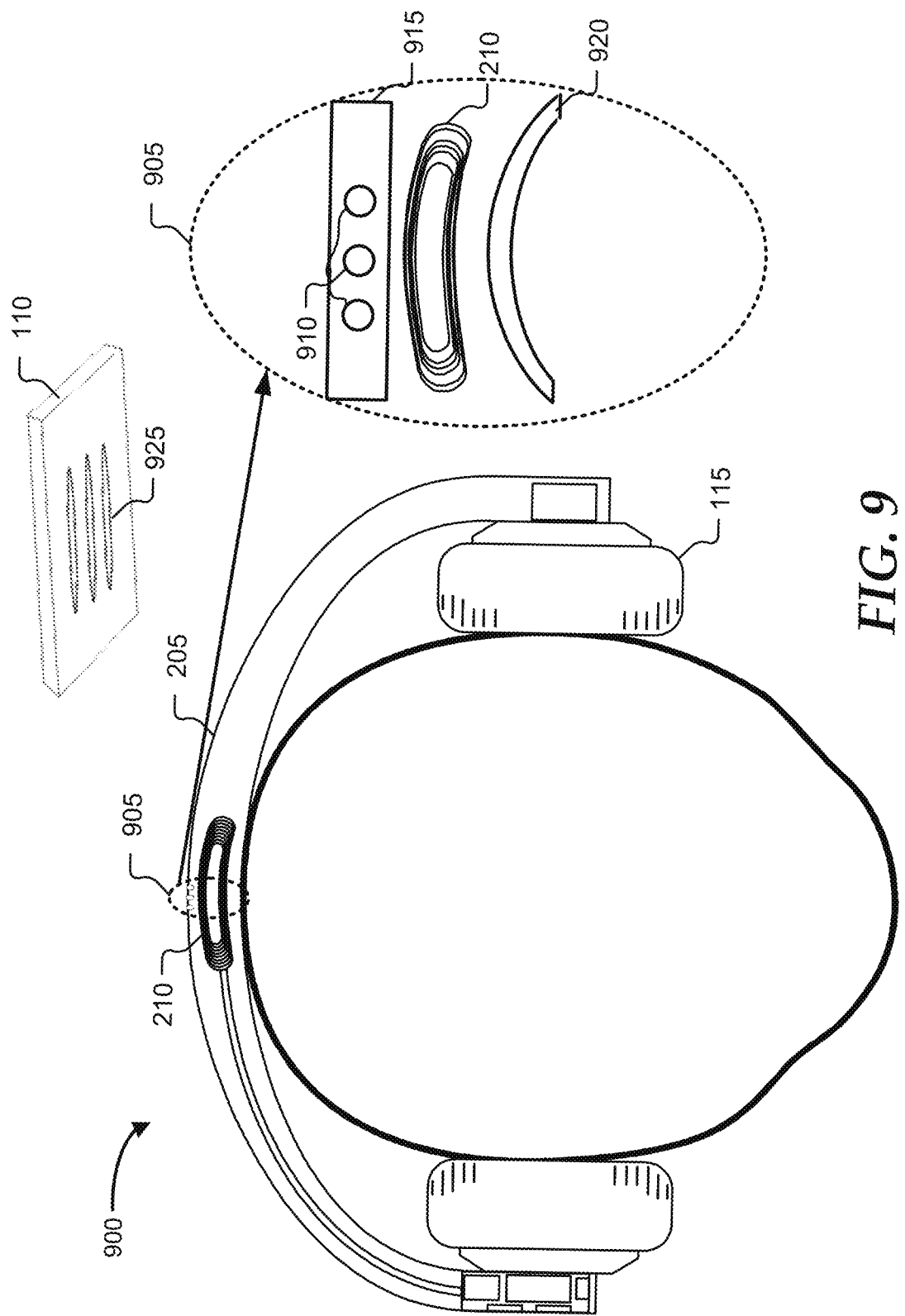
FIG. 9 is a block diagram illustrating a thermal solution for a wireless audio device and a wireless charger, according to an embodiment of the present disclosure.

FIG. 9 shows a thermal solution 900 for a wireless audio device and a wireless charger, according to an embodiment of the present disclosure. Wireless headphones 115 include one or more vents such as vents 910 on headband 205 as depicted in portion 905. Vents 910 is shown to be at the top portion of headband 205 allowing heat that may be generated during the power transfer between the transmission coil and the receiver coil to escape or dissipate. Because vents 910 are at the top portion of headband 205 instead of bottom portion 920, heat generated by receiver coil 210 is directed upwards away from a person's head. The bottom portion of wireless charger 110 may include one or more vents such as vents 925 which are used to release or dissipate heat from the transmission coil.

Those of ordinary skill in the art will appreciate that the configuration and components of wireless charger depicted in FIG. 3, FIG. 4, and FIG. 5 may vary. For example, the illustrative components of the wireless charger are not intended to be exhaustive, but rather are representative to highlight components that can be utilized to implement aspects of the present disclosure. For example, other components may be used in addition to or in place of the components depicted. The depicted example does not convey or imply any architectural or other limitations with respect to the presently described embodiments and/or the general disclosure. In the discussion of the figures, reference may also be made to components illustrated in other figures for continuity of the description.

Information handling system 100 may include processors, memories, a graphics adapter connected to a video display, a non-volatile RAM (NV-RAM) that includes a basic input and output system/extensible firmware interface (BIOS/EFI) module, a disk controller, a hard disk drive (HDD), an optical disk drive, a disk emulator connected to a solid-state drive (SSD), an input/output (I/O) interface connected to an add-on resource and a trusted platform module (TPM), a network interface, and a baseboard management controller (BMC) and other chipsets.

BMC is connected to multiple elements of information handling system 100 via one or more management interfaces to provide out-of-band monitoring, maintenance, and control of the elements of the information handling system. As such, BMC represents a processing device different from processor and processor, which provides various management functions for information handling system 100. For example, BMC may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC can vary considerably based on the type of information handling system. BMC can operate in accordance with an Intelligent Platform Management Interface (IPMI).

Examples of BMC 190 include an Integrated Dell Remote Access Controller (iDRAC) from Dell® is embedded within Dell PowerEdge™ servers and provides functionality that helps information technology (IT) administrators deploy, update, monitor, and maintain servers.

Management interface represents one or more out-of-band communication interfaces between BMC and the elements of information handling system 100, and can include an I2C bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors and procedures that are implemented on the information handling system in response to the executed code. BMC 190 operates to monitor and maintain system firmware, such as code stored in BIOS/EFI module 142, option ROMs for graphics adapter, disk controller, add-on resource, network interface, or other elements of information handling system 100, as needed or desired. In particular, BMC includes a network interface that can be connected to a remote management system to receive firmware updates, as needed or desired. Here, BMC receives the firmware updates, stores the updates to a data storage device associated with the BMC, transfers the firmware updates to the NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as a Web Services Management (WS-MAN) interface, a Management Component Transport Protocol (MCTP) or, a Redfish interface), various vendor-defined interfaces (such as a Dell EMC Remote Access Controller Administrator (RACADM) utility, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired. In a particular embodiment, BMC is included on a main circuit board (such as a baseboard, a motherboard, or any combination thereof) of information handling system 100 or is integrated onto another element of the information handling system such as the chipset, or another suitable element, as needed or desired. As such, BMC can be part of an integrated circuit or a chipset within information handling system 100. BMC may operate on a separate power plane from other resources in information handling system 100. Thus, BMC can communicate with the management system via network interface while the resources of information handling system 100 are powered off. Here, information can be sent from the management system to BMC and the information can be stored in a RAM or the NV-RAM associated with the BMC. Information stored in the RAM may be lost after power-down of the power plane for BMC, while information stored in the NV-RAM may be saved through a power-down/power-up cycle of the power plane for the BMC.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A wireless charging pad assembly comprising:
   a top portion that forms a conformable non-slip cover that conforms to a shape of a device placed on the wireless charging pad assembly; and
   a circuit disposed between a bottom portion and the top portion, wherein the circuit includes a charging coil mounted into a semi-rigid substrate that bends to match an arc of a curved portion of the device that is proximate to the conformable non-slip cover; and
   the bottom portion to support the circuit, the bottom portion being a rigid base to provide support to the conformable non-slip cover and the circuit.

2. The wireless charging pad assembly of claim 1, wherein the device is a wireless headset with a receiver coil in a connecting band between a left ear portion and a right ear portion.

3. The wireless charging pad assembly of claim 2, wherein the receiver coil in the connecting band is curved based on the arc of the connecting band.

4. The wireless charging pad assembly of claim 1, wherein the wireless charging pad assembly is integrated into a chassis of an information handling system.

5. The wireless charging pad assembly of claim 1, wherein the wireless charging pad assembly is retractable from a chassis of an information handling system.

6. The wireless charging pad assembly of claim 1, wherein a weight of the device applies a compression force that bends the conformable non-slip cover and the charging coil mounted on the semi-rigid substrate around a pivot point.

7. The wireless charging pad assembly of claim 1, wherein the charging coil can bend to match the arc of a receiver coil of the device placed on the wireless charging pad assembly.

8. The wireless charging pad assembly of claim 1, wherein if a curved device is placed on the conformable non-slip cover, then the conformable non-slip cover bends over a pivot point.

9. The wireless charging pad assembly of claim 1, wherein an initial shape of the top portion of the wireless charging pad assembly is flat.

10. An information handling system for inductively charging a device, comprising:
    a chassis; and
    a wireless charging pad assembly integrated with the chassis, wherein the wireless charging pad assembly includes:
      a flexible inductive charging coil mounted to a pliable semi-rigid substrate;
      a bendable electrical circuit providing electrical power to the charging coil; and a bottom portion supporting the charging coil and the electrical circuit.

11. The information handling system of claim 10, further comprising an electrical switch that electrically conveys the electrical power by extending the wireless charging pad assembly outside the chassis of the information handling system.

12. The information handling system of claim 11, wherein the electrical switch disconnects the electrical power when the wireless charging pad assembly is stowed inside the chassis.

13. The information handling system of claim 10, wherein the flexible inductive charging coil adopts a conformal arrangement with the device laid atop the wireless charging pad assembly.

14. The information handling system of claim 10, wherein the wireless charging pad assembly has a deployed position and a stowage position, the deployed position outwardly extending from an outer enclosure and conveying the electrical power to the flexible inductive charging coil, and the stowage position retracting within the outer enclosure and disconnecting the electrical power from the flexible inductive charging coil.

15. The information handling system of claim 10, wherein if a curved device is placed on a conformable non-slip cover, then the conformable non-slip cover bends over a pivot point.

16. The information handling system of claim 10, further comprising wherein the flexible inductive charging coil can bend to match an arc of a receiver coil of the device placed on the wireless charging pad assembly.

17. An information handling system, comprising:
a chassis;
a hinge having a first leaf and a second leaf, the first leaf attached to an outer enclosure housing the chassis; and
a wireless charging pad assembly attached to the second leaf of the hinge, the wireless charging pad assembly including a flexible inductive charging coil and a bendable electrical circuit, the flexible inductive charging coil mounted to a pliable semi-rigid substrate bending to a weight and shape of a device laid atop the wireless charging pad assembly.

18. The wireless charging pad assembly of claim 17, wherein the wireless charging pad assembly is configured to simultaneously charge multiple devices.

19. The wireless charging pad assembly of claim 17, wherein the wireless charging pad assembly is configured to simultaneously charge a flat device and a curved device.

20. The wireless charging pad assembly of claim 17, wherein the flexible inductive charging coil matches a particular geometry of a receiver coil of the device to be charged.

* * * * *